United States Patent
Rognli et al.

(10) Patent No.: US 9,927,131 B2
(45) Date of Patent: Mar. 27, 2018

(54) ELECTRIC WATER HEATER SYSTEMS FOR POWER GRIDS WITH DISTRIBUTED GENERATION

(71) Applicant: Cooper Technologies Company, Houston, TX (US)

(72) Inventors: Roger W. Rognli, Otsego, MN (US); Kevin Allmaras, Carrington, ND (US); Matthew Oong, Sydney (AU)

(73) Assignee: Eaton Intelligent Power Limited, Dublin (IE)

( * ) Notice: Subject to any disclaimer, the term of this patent is extended or adjusted under 35 U.S.C. 154(b) by 273 days.

(21) Appl. No.: 14/795,394

(22) Filed: Jul. 9, 2015

(65) Prior Publication Data

US 2016/0010879 A1    Jan. 14, 2016

Related U.S. Application Data

(60) Provisional application No. 62/023,045, filed on Jul. 10, 2014.

(51) Int. Cl.
| | |
|---|---|
| *F24D 19/10* | (2006.01) |
| *F24H 9/20* | (2006.01) |
| *G05B 15/02* | (2006.01) |
| *F24H 1/20* | (2006.01) |

(52) U.S. Cl.
CPC ......... *F24D 19/1063* (2013.01); *F24H 1/202* (2013.01); *F24H 9/2021* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 7,702,424 B2 | 4/2010 | Cannon et al. | |
| 7,869,904 B2 | 1/2011 | Cannon et al. | |
| 9,403,441 B2 | 8/2016 | Ashworth et al. | |
| 9,461,470 B2 | 10/2016 | Cox et al. | |
| 2007/0175883 A1 | 8/2007 | Miu et al. | |

(Continued)

FOREIGN PATENT DOCUMENTS

| | | |
|---|---|---|
| JP | 2006029635 A | 2/2006 |
| JP | 2011004476 A | 1/2011 |
| JP | 2014050275 A | 3/2014 |

OTHER PUBLICATIONS

Shuai Lu, Ruisheng Diao, Marcelo Elizondo, Chunlian Jin, Ebony Mayhorn, Yu Zhang, Harold Kirkham, Nader Samaan, Centralized and Decentralized Control for Demand Response, Apr. 29, 2011, IEEE.*

(Continued)

*Primary Examiner* — William B Partridge
*Assistant Examiner* — Istiaque Ahmed
(74) *Attorney, Agent, or Firm* — Patterson Thuente Pedersen, P.A.

(57) ABSTRACT

Systems and methods for storing power from distributed generation systems or other loads and sources that affect line voltage are disclosed. In embodiments, a water heater can be powered in a way that absorbs excess power from the grid by heating water when a controller senses excess power generation in the grid. Excess power generation can be sensed by either an increase in line voltage amplitude above a predetermined standard, or an increase in line voltage frequency above a predetermined standard.

19 Claims, 5 Drawing Sheets

(56) References Cited

U.S. PATENT DOCUMENTS

| | | | |
|---|---|---|---|
| 2010/0004790 A1* | 1/2010 | Harbin, III | F24D 19/1051 |
| | | | 700/291 |
| 2011/0123179 A1* | 5/2011 | Roetker | F24D 17/0031 |
| | | | 392/441 |
| 2012/0083939 A1 | 4/2012 | Rognli | |
| 2014/0214231 A1* | 7/2014 | Parsonnet | F24F 5/0017 |
| | | | 700/297 |

OTHER PUBLICATIONS

Marshall Brain, How Power Grids Work, Dec. 7, 2004, [retrieved on Jun. 28, 2017], Retrieved from the Internet: <URL: http://www.science.smith.edu/~jcardell/Courses/EGR220/ElecPwr_HSW.html>.*

Search Report and Written Opinion, for PCT Application PCT/US2015/039642, dated Oct. 16, 2015, 16 pages.

* cited by examiner

ELECTRIC WATER HEATER SYSTEMS FOR POWER GRIDS WITH DISTRIBUTED GENERATION

TECHNICAL FIELD

The claimed invention relates to a technology with a contribution to greenhouse gas emissions mitigation, and more particularly to water heater control systems for thermal storage of excess power from distributed-generation sources.

BACKGROUND

Conventionally, power distribution involved producing power at one or more power plants, then routing that power through a system of power cables, to inverters, to loads such as residential homes. Traditionally, distribution from the power plants to the loads includes several highly regulated steps whereby the voltage is sequentially reduced until it enters the residence at a predetermined, standard voltage. Furthermore, power is distributed with a predetermined, standard alternating current (AC) frequency.

Increasingly, power is supplied to power grids from distributed generation (DG) sources. Such DG sources include photovoltaics, solar-thermal systems, wind, biomass, and geothermal power sources, among others. DG sources provide a voltage boost to the grid wherever they are connected. In small quantities, DG sources can reduce the power required of a base load generator such as a power plant. As such, DG is seen as a mechanism for achieving reduced greenhouse gas emissions, and, if implemented properly, a mechanism for reducing load on the electrical grids on which they are deployed.

Conventional power grids are often ill equipped to deal with the ramifications, however, of DG power generation. In areas where DG sources exceed a certain threshold, the power generated by DG sources, either alone or in combination with power provided by a base plant, can exceed the demand for power amongst the loads on that portion of the grid. This can cause so-called "upstream" current flow, away from the DG sources and loads and towards the power plant. Conventional power grids can be damaged by this type of current flow, and often this scenario results in either overvoltage at the area of the grid having DG sources, or disconnection of the DG sources and loads from the grid entirely. The inability of conventional power grids to handle DG in excess of the power draw by nearby loads has caused some areas to throttle the implementation of renewable technologies where the DG sources combined exceed the minimum power usage in that area.

Furthermore, because conventional power grids rely on single (or few) sources to provide power to the grid, managing the frequency of the AC current provided is relatively simple. Conventional grids provide power at a predetermined frequency, and need only contend with the effects that connected loads may have on the signal shape. For these reasons, electronics that draw power from an electrical grid are often required to comply with standards to reduce unwanted effects on the shape of the signal on the power grid, such as harmonics. With the introduction of hundreds or thousands of DG sources, the shape of the power signal can be modified not just by resistive loads, but also by power sources. DG sources that provide power out of phase or do not provide clean sine wave voltages, can degrade the signal of the power supply. The inability of conventional power grids to maintain a clean, sinusoidal power supply with larger contributions from DG sources has caused some areas to throttle implementation of renewable technologies where the DG sources combined exceed a set percentage, for example 15%, of maximum power usage in that area.

It would be desirable to provide systems and methods that could address these issues for a power grid having DG sources.

SUMMARY OF THE INVENTION

An energy storage system for use on a power grid having DG sources includes a water heater tank, an upper heating package, a lower heating package, and a controller. The tank has a lower portion and an upper portion. The upper heating package includes an upper thermostat configured to sense an upper portion temperature and an upper resistive heating element configured to heat the upper portion. Likewise, the lower heating package includes a lower thermostat configured to sense a lower portion temperature, and a lower resistive heating element configured to heat the lower portion. The controller is coupled to a power line having a voltage. The controller is configured to:

(a) provide power to the upper resistive heating element when the upper portion temperature is below a first predefined temperature;

(b) provide power to the lower resistive heating element when the voltage exceeds a standard voltage and the lower portion temperature is below a second predefined temperature, and the conditions of (a) are not met;

(c) provide power to the lower resistive heating element when the voltage is less than the standard voltage and the lower portion temperature is below a third predefined temperature, and the conditions of (a) are not met; and (d) turn off power to both the lower and upper resistive heating elements when none of the conditions (a)-(c) are met.

The above summary of the invention is not intended to describe each illustrated embodiment or every implementation of the present invention. The detailed description and claims that follow more particularly exemplify these embodiments.

Figure 1:
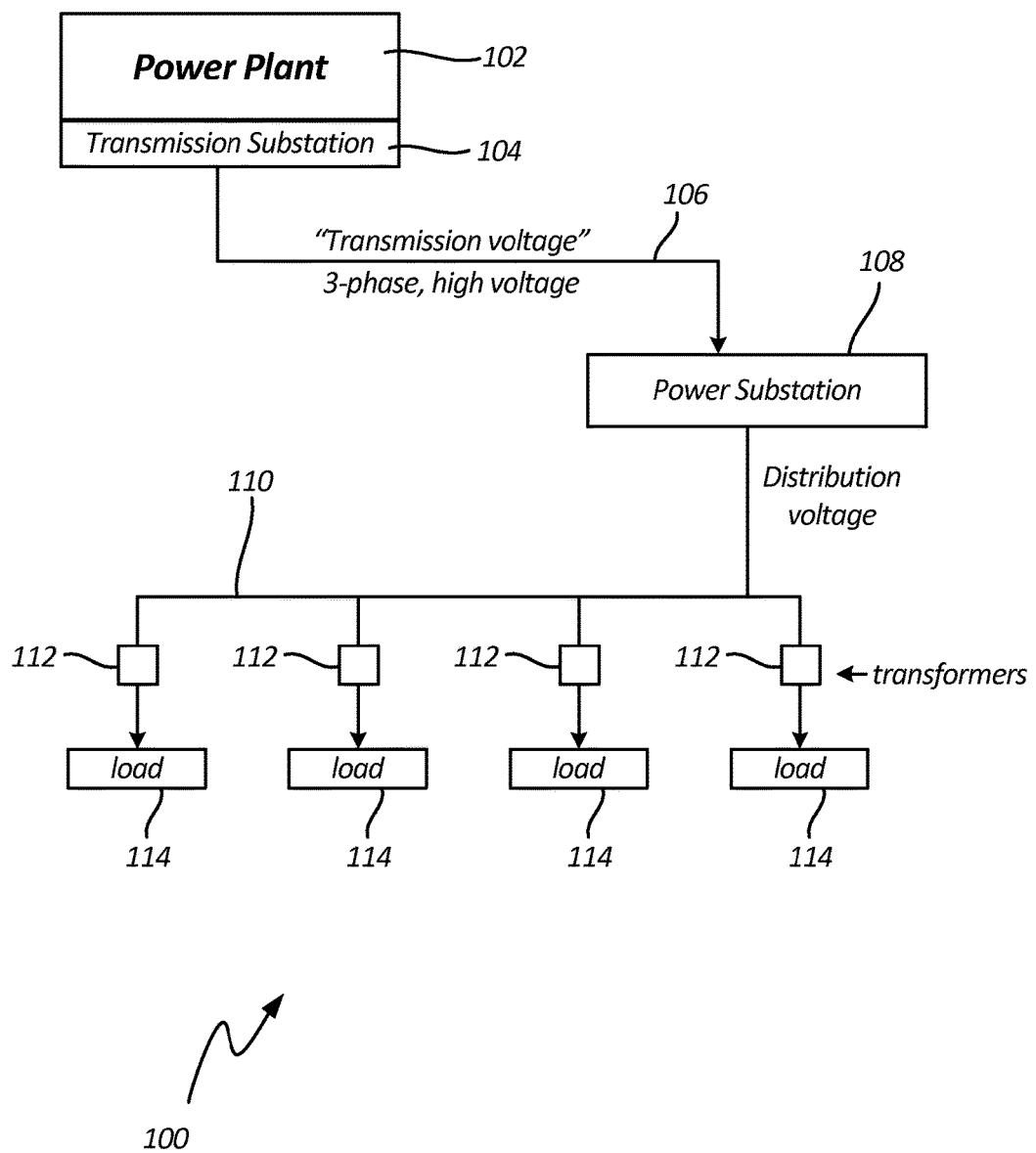
FIG. 1 is a schematic illustration of a simple power distribution system, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims and their equivalents.

The invention may be embodied in other specific forms without departing from the essential attributes thereof; therefore, the illustrated embodiments should be considered in all respects as illustrative and not restrictive.

DETAILED DESCRIPTION OF THE DRAWINGS

According to various embodiments, a hot water heater is operable in such a way that excess power from a power grid is absorbed in the form of thermal energy, preventing disconnection of a distribution network from the broader grid. In some embodiments, the distribution network comprises one or more distributed generation (DG) sources. By absorbing the excess energy from the grid during peak DG production periods, renewable energy sources can be used more efficiently, without damaging equipment or appliances. Such energy absorption, and its later release, provides benefits to users of the grid as well as the utility. Applications and methods for managing the use of such water heaters, as well as allocating the benefits therefrom, are also disclosed, according to further embodiments.

FIG. 1 is a schematic illustration of power distribution system 100, according to an embodiment. Power distribution system 100 includes power plant 102, transmission substation 104, transmission lines 106, power substation 108, distribution bus 110, transformers 112, and loads 114.

Power plant 102 can be any power generator, such as a coal plant, natural gas plant, hydroelectric plant, nuclear plant, or any other type of power plant. The system shown in FIG. 1 is simplified, in that power distribution system 100 only includes one power plant 102. In complex power distribution grids, multiple power plants 102 may be used. For example, in modern complex distribution grids, there may be "base load" plants 102 which generate a constant quantity of power at relatively low cost per Watt-hour (Wh), and various supplemental power plants 102 that are used during periods with increased power usage.

Power plant 102 is arranged adjacent to transmission substation 104 in the schematic of FIG. 1. Transmission stations 104 regulate the output of power plants 102, providing a high-voltage, three-phase output that is suitable for transmission across long distances to remote loads.

Transmission lines 106 route power from transmission substations 104. Often, the majority of the distance between power plant 102 and the desired final location for power produced therefrom is crossed via transmission lines 106. Transmission lines 106 are configured to carry three-phase power (often via four power lines: one for each of the three phases, and one for ground) at very high voltage.

Power substations 108 receive power from transmission lines 106, and reduce the voltage to a distribution voltage. Often the distribution voltage is a few thousand volts. The power at distribution voltage can then be distributed across distribution bus 110.

Transformers 112 reduce the voltage even further, to a standard voltage that is usually determined by the country in which the power distribution system 100 is located. For example, in the United States the peaks of the distribution voltage should be approximately 170V (with a root-mean-square voltage of 120V).

Loads 114 could be any of a variety of loads, such that the impedance of each load 114 can be different from one another and can vary with time. Some loads 114 can be purely resistive, others can introduce feedback (such as harmonics or other effects that degrade the sinusoidal nature of the supplied power). Loads 114 can be residential, governmental, or commercial. One example of a load 114 is a house, which draws power from distribution bus 110 to run electrical appliances such as air conditioning, lighting, and electronics.

Conventionally, loads 114 all have positive impedance; that is, each of loads 114 draws power from distribution bus 110. With the introduction of DG sources, loads 114 may in fact provide more energy back to distribution bus 110 than they consume. Many transformers 112 allow power to flow back from loads 114 into distribution bus 110, where it can be used by other loads 114. If a sufficiently large quantity of DG sources are generating power, and the power output from those DG sources onto distribution bus 110 exceeds the draw of power from distribution bus 110, then power will continue to flow opposite to the conventional power distribution direction. This so-called "upstream" power flow, through power substations 108 and even to transmission substations 104, can be damaging to equipment that was not designed to accommodate upstream flow.

Some line inverters and substations of conventional systems do not allow upstream flow at all, or restrict it. In those situations, the voltage on distribution bus 110 will exceed the predefined distribution voltage. As such, transformers 112 provide a proportionally high voltage to loads 114. These high voltages can be dangerous, and can damage electronics present at loads 114. Often, to prevent damage or injury resulting from these high voltages, a utility responds to over voltage conditions by disconnecting the area of the grid.

According to one embodiment, loads 114 include water heaters configured to draw power from distribution bus 110 when the voltage on distribution bus 110 exceeds a certain limit. In some embodiments, these water heaters are configured to continue to draw power from distribution bus 110 until either the water contained therein reaches a maximum, or until the voltage on distribution bus 110 returns to a normal level. Such systems effectively increase the impedance of loads 114 to absorb excess DG power, and prevent damage to or disconnection of power distribution system 100.

Figure 2:
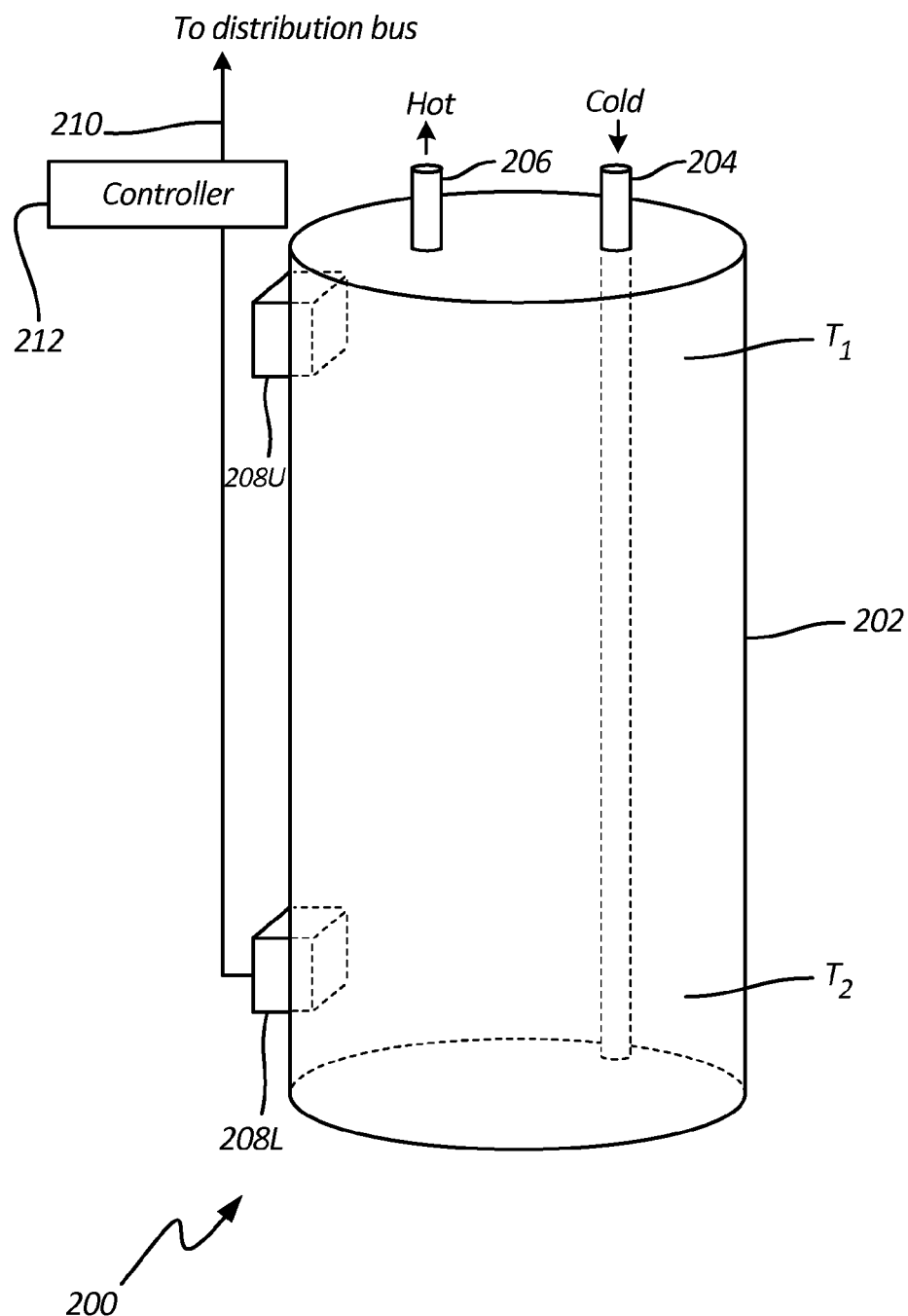
FIG. 2 is a simplified perspective view of a water heating system according to an embodiment.

FIG. 2 is a simplified perspective view of a water heating system 200, according to an embodiment. According to the embodiment shown in FIG. 2, a tank 202 is coupled to a water line via cold water input 204, and provides hot water via hot water output 206. Water heating system 200 includes lower heating package 208L and upper heating package 208U. Each of the water heating packages 208L and 208U are connected to power line 210 via controller 212. Power line 210 is connected to a distribution grid (e.g., distribution bus 110 of FIG. 1), via an intervening transformer (e.g., transformer 112 of FIG. 1). It should be understood that water heating system 200 of FIG. 2 has been simplified for clarity. For example, tank 202 may contain safety pressure relief systems or water draining systems that are not directly impacted by the systems described herein, and as such have been omitted.

To aid in description of water heating system 200, directional labels such as "top" and "bottom" or "upper" and "lower" are used. It should be understood that these labels are with reference to a gravitational reference frame. As shown in FIG. 2, the "top" is at the top of the page and the "bottom" is at the bottom of the page. These directions are useful in describing the function of a traditional water heater, wherein stored hot water rises while stored cold water falls, with respect to gravity. In other embodiments, other reference frames may be used, and the reference frame described herein should not be construed to limit the invention, as there are other orientations and reference frames that are usable to accomplish the same or similar results.

Like conventional water heater tanks, tank 202 is configured to hold a certain quantity of hot water (often 20-100 gallons) ready for use in a residential setting. In operation, the water contained by tank 202 is thermally stratified; that is, the water at the top of tank 202 will be at a relatively higher temperature (indicated as temperature T1), while the water at the bottom of tank 202 will be at a relatively lower temperature (indicated as temperature T2).

Cold water is introduced at cold water input 204, which is attached to a water source (such as a municipal water line or a well) to provide a supply of cold water. To promote the thermal stratification of the water held by tank 202, cold water input 204 routes this cold water to the bottom of tank 202. As shown in FIG. 2, cold water input 204 is a dip tube. Similarly, hot water output 206 promotes the thermal stratification of tank 202 by removing hot water from a location near the top of tank 202. Typically, as hot water output 206 draws water from tank 202, a substantially equivalent quantity of cold water is introduced at the bottom of tank 202 by cold water input 204.

In some embodiments, as cold water is introduced at the bottom of the tank the bottom thermostat will call for heat and energize the bottom element (assuming that the top element is not heating). While the bottom thermostat and element do most of the water heating work, the top thermostat and element can be used to respond to an extended hot water draw. The top thermostat and element thus provide for fast recovery.

Lower heating package 208L and upper heating package 208U include resistive heaters in the embodiment shown in FIG. 2, configured to heat water in tank 202, as well as thermostats. Lower heating package 208L and upper heating package 208U typically will not operate their resistive heaters at the same time, to prevent overloading the circuit from which water heating system 200 draws power. Rather, upper heating package 208U is configured to heat the water stored in the upper portion of tank 202 until the temperature T1 in that region reaches a preset value. Once temperature T1 reaches that preset value, lower heating package 208L is configured to heat the water stored in the lower portion of tank 202 until the temperature T2 in that region reaches a second preset value, often lower than the preset value for temperature T1.

Power line 210 provides power to operate lower heating package 208L and upper heating package 208U. Power line 210 is connected to a distribution bus (e.g., distribution bus 110 of FIG. 1). In some embodiments, a simple step-down transformer (e.g., transformer 112 of FIG. 1) is located in between power line 210 and the distribution bus. Thus, when DG sources combine to raise the voltage present on the distribution bus, the voltage on power line 210 rises proportionally.

Controller 212 alters the target temperatures to be reached based on the voltage at power line 210. Controller 212 senses the voltage on power line 210, and allocates power to each of the heating packages 208L and 208U accordingly. In doing so, controller 212 causes increased power draw when power line 210 is above its standard voltage, storing the energy derived therefrom as thermal energy in tank 202. Later, water heating system 200 need not draw as much power from the distribution bus, because the water contained therein will have been preheated.

Controller 212 comprises a means for communicating with both upper heating package 208U and lower heating package 208L. In the embodiment shown in FIG. 2, this is a wired communications means. In alternative embodiments, however, the means for communicating with two or more heating packages can be wired or wireless. For example, a wired means could include a signal wire that instructs either of the heating packages 208U and/or 208L whether to operate or cease operating. In other embodiments, the means for wired communication could be a power cable that is either powered or unpowered based on whether the heating packages 208U and/or 208L should run. In other embodiments, controller 212 can provide a wireless signal, such as via WIFI, Bluetooth, or another signal that propagates wirelessly, to instruct the heating packages 208U and/or 208L that they should run or not run. In embodiments, power need not be routed to the heating packages 208U and/or 208L through controller 212.

By powering the heating packages 208U and 208L as directed by the controller 212, the draw of power from the distribution bus can be spread out to make improved use of DG sources, and prevent disconnection of the distribution bus from the wider power grid as a result of overvoltage. Particular methods for operating the heating packages 208U and 208L can be implemented by the controller 212. The means for carrying out these methods can be incorporated into the controller 212 as, for example, software (e.g., a processor that is designed to run a particular routine for operating the heating packages 208U and 208L based on received inputs) or hardware (e.g., bimetal thermometers, liquid expansion thermometers, or other sensors and/or actuators that correspond to specific temperatures at locations within the tank 202, for example). One specific method by which controller 212 can be operated is described with respect to FIG. 4, for example.

Figure 3:
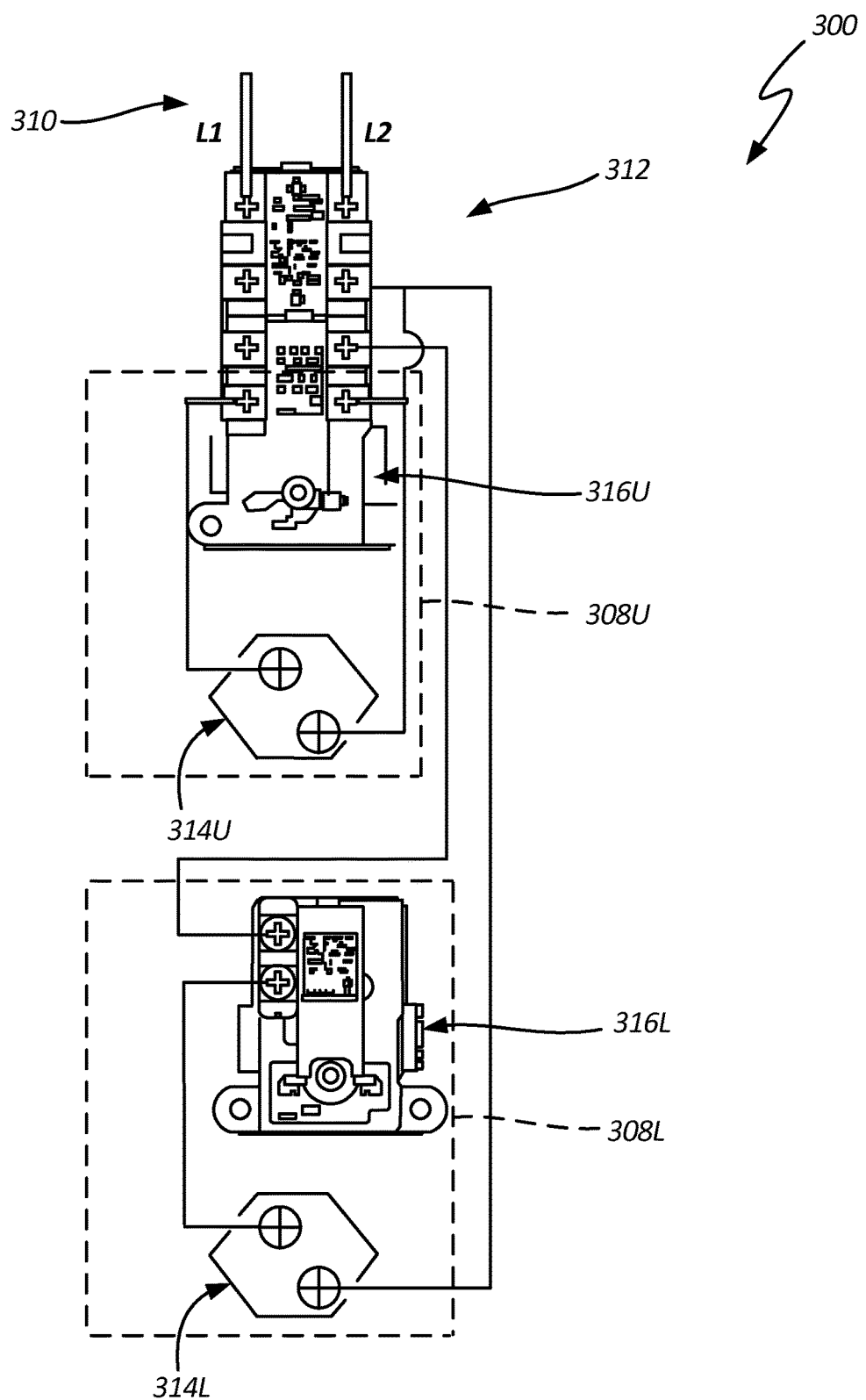
FIG. 3 is a wiring diagram of a water heater according to an embodiment.

FIG. 3 is a wiring diagram of a water heating system 300, according to an embodiment. Water heating system 300 includes lower heating package 308L, upper heating package 308U, power line 310, and controller 312. Lower heating package 308L includes lower resistive load 314L and lower thermostat 316L. Similarly, upper heating package 308U includes upper resistive load 314U and upper thermostat 316U. Similar elements to those described previously with respect to FIG. 2 are recognizable by similar numbering, in that those elements are iterated by 100. For example, lower heating package 208L of FIG. 2 is substantially similar to lower heating package 308L of FIG. 3, and so on.

Each of the heating packages 308L and 308U are shown in more detail, and include both a resistive load (314L, 314U) and a thermostat (316L, 316U). The resistive loads (314L, 314U) can be used to convert electrical energy into thermal energy, dissipating heat into the adjacent water. As such, resistive loads 314L and 314U can be, for example, simple resistors. Thermostats 316L and 316U gauge temperature in the lower and upper portions of the water heater system (e.g., T2 and T1 of FIG. 2). Thermostats 316L and 316U could be, for example, thermocouples, thermistors, resistance thermometers, or some other device for measuring temperature.

Each of the heating packages 308L and 308U receive power via leads (indicated as red, black, blue, and yellow) that connect them to power line 310 via controller 312. Controller 312 is configured to distribute power to each of the heating packages 308L and 308U based on the temperature measured at each of the thermostats 316L and 316U, as well as the voltage at power line 310. Controller 312 can allocate power amongst lower and upper heating packages 308L and 308U to maintain appropriate water temperature and/or store electrical energy from power lines 310 during specific time periods.

3Controller 312 can also be configured to interact with a wired or wireless network. For example, controller 312 can include a processor and an antenna or bus configured to route data about the operation of the system to a mobile device, a server, or the utility.

Figure 4:
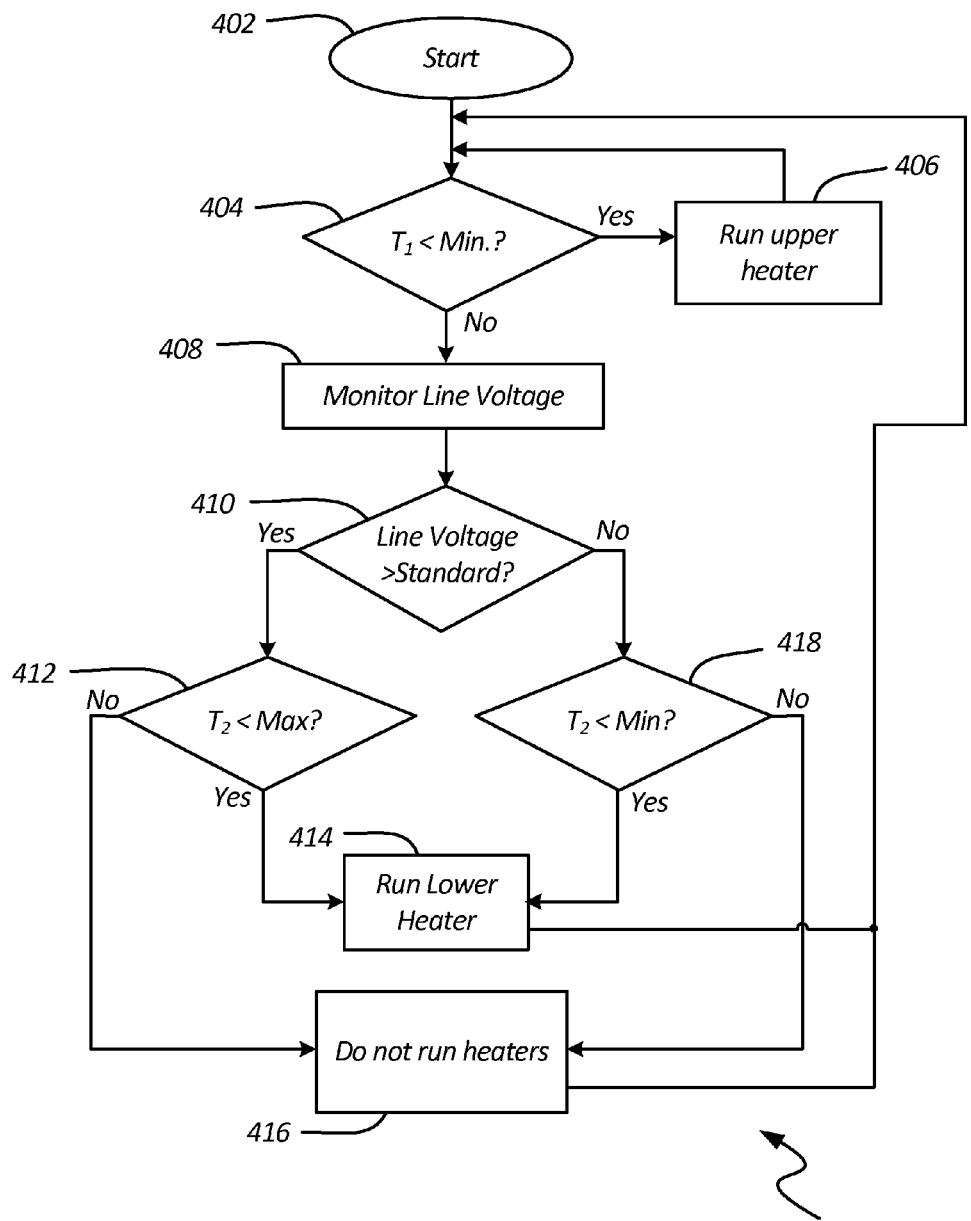
FIG. 4 is a flowchart depicting a method of operating a water heater according to an embodiment.

FIG. 4 is a flowchart depicting a method 400 of operating a water heater according to an embodiment.

The method begins at start block 402.

At block 404, the temperature T1 in the upper portion of the water heater (see, e.g., the embodiment shown in FIG. 2) is measured. The standard electric water heater uses two elements, each controlled by a thermostat. Power is supplied to a factory set high limit attached to the upper thermostat. If the upper thermostat is calling for heat (i.e., if T1 is less than a minimum predetermined temperature), it connects power to the upper heating element, as shown at block 406. In some embodiments, the upper thermostat and element heat the top 25% to 30% of the water, while the remainder of the water is heated by the lower thermostat and element. Once the upper thermostat condition of block 404 switches to "No," power can be sent to the lower heating element. Water heaters work in this non-simultaneous fashion so that the load never exceeds the maximum of the associated circuit breaker and wires.

At block 408, line voltage is measured. Renewable generation in a given area can exceed the load in that area, driving up the line voltage. If the voltage gets too high, the renewable generation will trip off line. As such, according to some embodiments, the line voltage is measured and load attached to the grid to absorb renewable energy while maintaining the customer supply of needed hot water.

At block 410, the line voltage is compared to a standard line voltage. For example, in some locations standard line voltage is 120V AC. If those locations, if the line voltage monitored in block 408 exceeds 120V AC, the line voltage exceeds the standard. In other locations, different standard voltages can be used, depending on the typical line voltage in that region.

The purpose of the comparison described at block 410 is to ascertain those time periods where an excess of DG-based power is affecting the power grid. The comparison between line voltage and the standard line voltage determines the behavior of the lower heater, such that the lower heater is more likely to run when line voltage exceeds the standard, as described in more detail with respect to the remaining blocks of the flow chart. In some embodiments, it may be desirable to require some additional voltage offset, such that the lower heater is not likely to be activated to absorb excess energy unless there is truly a glut of DG-supplied power. For example, in the embodiment described above, the standard compared to the line voltage could be set at 121V, 122V, 125V, or any other voltage selected to reduce the likelihood of a "false positive" of excess DG-based power. Additionally, in some embodiments, utilities can actively control DG-generated power by either directly or indirectly adjusting the voltages that control the system. In some embodiments, the utility can remotely modify the voltage set-point that indicates that excess renewable energy is available.

If the line voltage is greater than the standard (or the standard plus some offset) as described at block 410, then the system considers whether the lower temperature T2 is less than a predetermined maximum at block 412. The maximum temperature at block 412 is in place for safety and to prevent damage to the heater system. The maximum temperature depends on many factors, including the hot water temperature set point that the user of the hot water sets. In some embodiments, mixing valves on the hot water delivery side can allow the tank to be driven to higher temperatures in order to absorb more renewable energy.

If the temperature is less than the predetermined maximum at block 412, then the lower heater is operated at block 414. As the lower heater is run (block 414), the upper temperature T1 is compared to its minimum value at block 404, the line voltage is again monitored at block 408, and the temperature compared to a predetermined maximum at block 412, as previously described.

In the event that the temperature T2 exceeds its predetermined maximum at block 412 while the line voltage still exceeds the standard set point at block 410, the lower heater will be shut off at block 416. This prevents a variety of undesirable effects, such as scalding water provided by the water heater system or damage to components of the water heater caused by excessive heat. The lower heater will remain off until the lower temperature T2 falls.

The lower heater can still run even if the line voltage does not exceed the standard voltage at block 410. In the event that the line voltage does not exceed the standard, the water heater operates in a similar fashion to conventional water heaters, starting at block 418. The bottom thermostat and element run when the lower temperature T2 is below a minimum temperature. The minimum temperature is often far less than the set point for the upper temperature T1, as described with respect to block 404. The minimum temperature is set to preheat water and ensure that hot water can be provided during a sustained water draw.

At block 420, if the lower temperature T2 is below the minimum, the lower heater will be operated at block 414. If the temperature T2 in the lower portion of the water heater exceeds the minimum at block 418, neither upper nor lower heaters are operated, at block 416.

The flowchart above describes an improved system for operation of an electric water heater. Rather than a simple on/off switch with a temperature setting, the thermostats of the water heater can control the lower heating element at two different set points. The lower set point is used when the voltage on the line is normal. This lower set point warms the water to ensure there is sufficient hot water in the event of a large draw, and that the upper element will be able to supply the amount of hot water required. If the line voltage exceeds some preset level, then a higher set point is used. In this way the water heater can absorb some of the excess renewable energy.

In alternative control methods, the system can be modified to include other features. For example, in some embodiments, sanitization cycles can be performed. *Legionella* is a group of bacterial that is common in soil and aquatic systems including water heaters. Often, water heaters are operated at temperatures that coincide with good growing conditions for *Legionella*. As such, in some embodiments the water heater control system may designed to periodically bring the entire tank temperature to a kill point for *Legionella* or other bacteria. For example, the system could be configured to reach 122° F. once per week for one hour.

Additionally or alternatively, the system could incorporate a reporting function, whereby the control system periodically reports operational conditions including water temperatures, line voltage, and more complex data such as power absorbed or renewable energy stored, to the residential user of the water heater, the utility, and/or any other party. This functionality could be enabled via a Wi-Fi connection to the water heater control system, which can allow the utility to change the voltage levels at block 410, and could allow the utility to call or prevent a renewable charge based on factors other than voltage. It could also let the utility know how much load they have available (i.e., how many heaters in the area of the electrical grid are capable of absorbing additional renewable energy). This dispatchability can be particularly useful when dealing with wind generation. An App could let the customer monitor and control the usage of their water heater much the same way they can use a programmable thermostat to set their cooling and heating systems.

Figure 5:
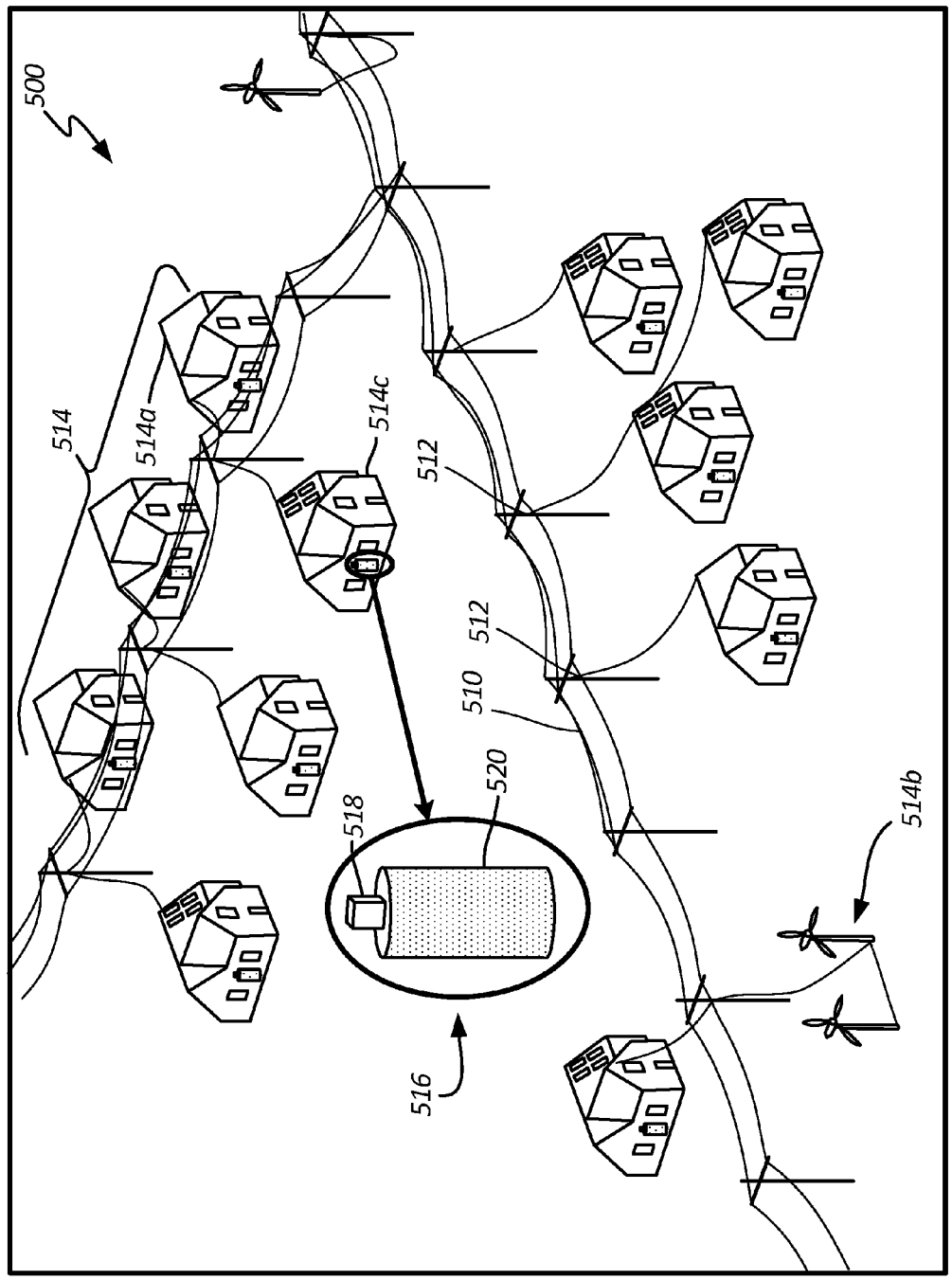
FIG. 5 is a schematic of a network of distributed generation sources, loads, and water heaters, according to an embodiment.

FIG. 5 is a schematic of a network 500 of distributed generation sources, loads, and water heaters, according to an embodiment. As shown in FIG. 5, a distribution bus 510 carries electrical power throughout an area of the electrical grid. At various points along distribution bus 510, transformers 512 split a single-phase power line off from the main distribution bus 510 towards loads 514. Loads 514 come in various types: there are purely positive-impedance loads 514a, which take power from distribution bus 510. There are also purely negative-impedance loads 514b, which are not really "loads" in the conventional sense but rather DG power sources. Finally, there are mixed loads 514c, which have DG generation capability (shown as photovoltaic panels in FIG. 5) but also draw power from the electrical grid.

In the network 500 shown in FIG. 5, each of the positive-impedance loads 514a and mixed loads 514c are outfitted with a renewable-aware water heater 516. Each renewable-aware water heater 516 includes a control module 518 and a water heater tank 520. The control module 518 can operate thermostats and/or heating elements of the water heater tank 520, for example in accordance with the method described with respect to FIG. 4.

Various software can be implemented to control the water heating systems described in the previous figures. For example, the water heater control system can be connected to a wired or wireless network that permits access to the control system from a server or cloud in some embodiments. In these embodiments, the temperature and voltage set points for the system can be controlled, either by the user of the hot water or by the utility that operates the electrical grid. Firmware can be used to add timers, counters, delays, and/or other parameters and features to modify the functionality of the heater. These parameters can include the over voltage level, the normal voltage level, the normal voltage temperature settings, and the over voltage temperature settings. In embodiments having such software, the controller can include a processor, antenna, and/or other features necessary to communicate with a mobile device, wired or wireless network, or smartphone.

In one embodiment, a standard 52-gallon water heater operating at normal voltage has a delivery temperature of 120° F., and a lower thermostat setting of 70°. At over voltage, the delivery temperature is increased to 130°, and the lower thermostat setting changed to 120°. In this way, several kWh of energy can be absorbed in the form of hot water. In embodiments, the amount of energy stored can be 4 to 6 kWh depending on tank size and temperature settings.

The systems and methods of operating them described above can result in benefits to both the user of the hot water and the utility company. These benefits include reduced down time related to disconnection of the portion of the grid that has excess DG power, and increased renewable energy capability on the grid. These benefits can be shared between the utility and the user in the form of rebates or discounts for users of the system. As use of such systems increases, their ability to store excess power increases, increasing their value to utilities.

Various embodiments of systems, devices, and methods have been described herein. These embodiments are given only by way of example and are not intended to limit the scope of the invention. It should be appreciated, moreover, that the various features of the embodiments that have been described can be combined in various ways to produce numerous additional embodiments. Moreover, while various materials, dimensions, shapes, configurations and locations, etc. have been described for use with disclosed embodiments, others besides those disclosed can be utilized without exceeding the scope of the invention.

Persons of ordinary skill in the relevant arts will recognize that the invention can comprise fewer features than illustrated in any individual embodiment described above. The embodiments described herein are not meant to be an exhaustive presentation of the ways in which the various features of the invention can be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim can refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. An energy storage system for thermal storage of excess power from distributed-generation sources on a power line comprising:
   a water heater tank having a lower portion and an upper portion;
   an upper heating package having:
      an upper thermostat configured to sense an upper portion temperature; and
      an upper resistive heating element configured to provide heat at the upper portion;
   a lower heating package having:
      a lower thermostat configured to sense a lower portion temperature; and a lower resistive heating element configured to provide heat at the lower portion; and a controller operably coupled to the power line and the water heater tank and configured to:
  (a) provide power to the upper resistive heating element when the upper portion temperature is below a first selected temperature;
  (b) provide power to the lower resistive heating element when the controller senses that an amplitude of the voltage exceeds a predetermined amplitude and the lower portion temperature is below a second selected temperature;
  (c) provide power to the lower resistive heating element when the controller senses the amplitude is less than the predetermined amplitude and the lower portion temperature is below a third selected temperature; and
  (d) turn off power to both the lower resistive heating element and the upper resistive heating element when none of the conditions (a)-(c) are met.

2. The energy storage system of claim 1, wherein the upper portion and the lower portion are in fluid communication with one another.

3. The energy storage system of claim 2, further comprising a hot water output in fluid communication with the upper portion.

4. The energy storage system of claim 3, further comprising a cold water input in fluid communication with the lower portion.

5. The energy storage system of claim 4, wherein the cold water input is configured to deliver cold water to the lower portion at substantially the same rate as hot water is taken from the upper portion via the hot water output.

6. An energy storage system for thermal storage of excess power from distributed-generation sources on a power line comprising:
  a water heater tank having a lower portion and an upper portion;
  an upper heating package having:
    an upper thermostat configured to sense an upper portion temperature; and
    an upper resistive heating element configured to provide heat at the upper portion;
  a lower heating package having:
    a lower thermostat configured to sense a lower portion temperature; and
    a lower resistive heating element configured to provide heat at the lower portion; and
  a controller operably coupled to the power line and the water heater tank and configured to:
    (a) provide power to the upper resistive heating element when the upper portion temperature is below a first selected temperature;
    (b) provide power to the lower resistive heating element when the controller senses that a frequency of the voltage exceeds a predetermined frequency and the lower portion temperature is below a second selected temperature;
    (c) provide power to the lower resistive heating element when the controller senses the frequency is less than the predetermined frequency and the lower portion temperature is below a third selected temperature; and
    (d) turn off power to both the lower resistive heating element and the upper resistive heating element when none of the conditions (a)-(c) are met.

7. The energy storage system of claim 6, wherein the upper portion and the lower portion are in fluid communication with one another.

8. The energy storage system of claim 7, further comprising a hot water output in fluid communication with the upper portion.

9. The energy storage system of claim 8, further comprising a cold water input in fluid communication with the lower portion.

10. The energy storage system of claim 9, wherein the cold water input is configured to deliver cold water to the lower portion at substantially the same rate as hot water is taken from the upper portion via the hot water output.

11. A controller electrically coupled to a power line having a line distribution voltage having a line amplitude and a line frequency, the controller comprising:
  means for communicating with both an upper heating package having an upper resistive heating element and a lower heating package having a lower resistive heating element;
  means for receiving a first sensed temperature at the upper heating package and a second sensed temperature at the lower heating package; and
  means for operating an upper heating element and a lower heating element, wherein the upper heating element is disposed at the upper heating package and the lower heating element is disposed at the lower heating package, wherein the means for operating the upper heating element and the lower heating element is configured to:
    (a) provide power to the upper resistive heating element when the upper portion temperature is below a first selected temperature;
    (b) provide power to the lower resistive heating element when the controller senses that the line amplitude exceeds a predetermined amplitude and the lower portion temperature is below a second selected temperature;
    (c) provide power to the lower resistive heating element when the controller senses that the line amplitude is less than the predetermined amplitude and the lower portion temperature is below a third selected temperature; and
    (d) turn off power to both the lower resistive heating element and the upper resistive heating element when none of the conditions (a)-(c) are met.

12. The controller of claim 11, wherein each of the upper heating package and the lower heating package are configured to send and receive communications with the controller to activate their respective resistive heating elements.

13. A controller electrically coupled to a power line having a line distribution voltage having a line amplitude and a line frequency, the controller comprising:
  means for communicating with both an upper heating package having an upper resistive heating element and a lower heating package having a lower resistive heating element;
  means for receiving a first sensed temperature at the upper heating package and a second sensed temperature at the lower heating package; and
  means for operating an upper heating element and a lower heating element, wherein the upper heating element is disposed at the upper heating package and the lower heating element is disposed at the lower heating package, wherein the means for operating the upper heating element and the lower heating element is configured to:

(a) provide power to the upper resistive heating element when the upper portion temperature is below a first selected temperature;
(b) provide power to the lower resistive heating element when the controller senses that the line frequency exceeds a predetermined frequency and the lower portion temperature is below a second selected temperature;
(c) provide power to the lower resistive heating element when the controller senses that the line frequency is less than the predetermined frequency and the lower portion temperature is below a third selected temperature; and
(d) turn off power to both the lower resistive heating element and the upper resistive heating element when none of the conditions (a)-(c) are met.

14. The controller of claim 13, wherein each of the upper heating package and the lower heating package are configured to send and receive communications with the controller to activate their respective resistive heating elements.

15. A power grid control system configured to utilize thermal storage of excess power from distributed-generation sources on the power grid comprising:
a power distribution bus having a line amplitude and a line frequency;
a plurality of transformers, each configured to provide power to an attached load from the distribution bus, wherein at least one of the attached loads includes a distributed-generation power source; and
a controller coupled to the power distribution bus and configured to receive a sensed temperature at the upper portion and a sensed temperature at the lower portion and to selectively activate a resistive heating element that is electrically connected to the distribution bus and positioned in a water tank, wherein the controller is configured to:
(a) provide power to the upper resistive heating element when the upper portion temperature is below a first selected temperature;
(b) provide power to the lower resistive heating element when the controller senses that the line amplitude exceeds a predetermined amplitude and the lower portion temperature is below a second selected temperature;
(c) provide power to the lower resistive heating element when the controller senses that the line amplitude is less than the predetermined amplitude and the lower portion temperature is below a third selected temperature; and
(d) turn off power to both the lower resistive heating element and the upper resistive heating element when none of the conditions (a)-(c) are met.

16. The power grid control system of claim 15, wherein the water tank is configured to provide hot water to a residence.

17. The power grid control system of claim 15, wherein providing power in step (b) reduces the line voltage.

18. A power grid control system configured to utilize thermal storage of excess power from distributed-generation sources on the power grid comprising:
a power distribution bus having a line amplitude and a line frequency;
a plurality of transformers, each configured to provide power to an attached load from the distribution bus, wherein at least one of the attached loads includes a distributed-generation power source; and
a controller configured to receive a sensed temperature at the upper portion and a sensed temperature at the lower portion and to selectively activate a resistive heating element that is electrically connected to the distribution bus and positioned in a water tank, wherein the controller is configured to:
(a) provide power to the upper resistive heating element when the upper portion temperature is below a first selected temperature;
(b) provide power to the lower resistive heating element when the controller senses that the line frequency exceeds a predetermined frequency and the lower portion temperature is below a second selected temperature;
(c) provide power to the lower resistive heating element when the controller senses that the line frequency is less than the predetermined frequency and the lower portion temperature is below a third selected temperature; and
(d) turn off power to both the lower resistive heating element and the upper resistive heating element when none of the conditions (a)-(c) are met.

19. The power grid control system of claim 18, wherein providing power in step (b) reduces the line frequency.

* * * * *